R. F. CRAWFORD.
POWER TRANSMISSION DEVICE.
APPLICATION FILED JUNE 9, 1920.
1,379,534.
Patented May 24, 1921.
2 SHEETS—SHEET 1.
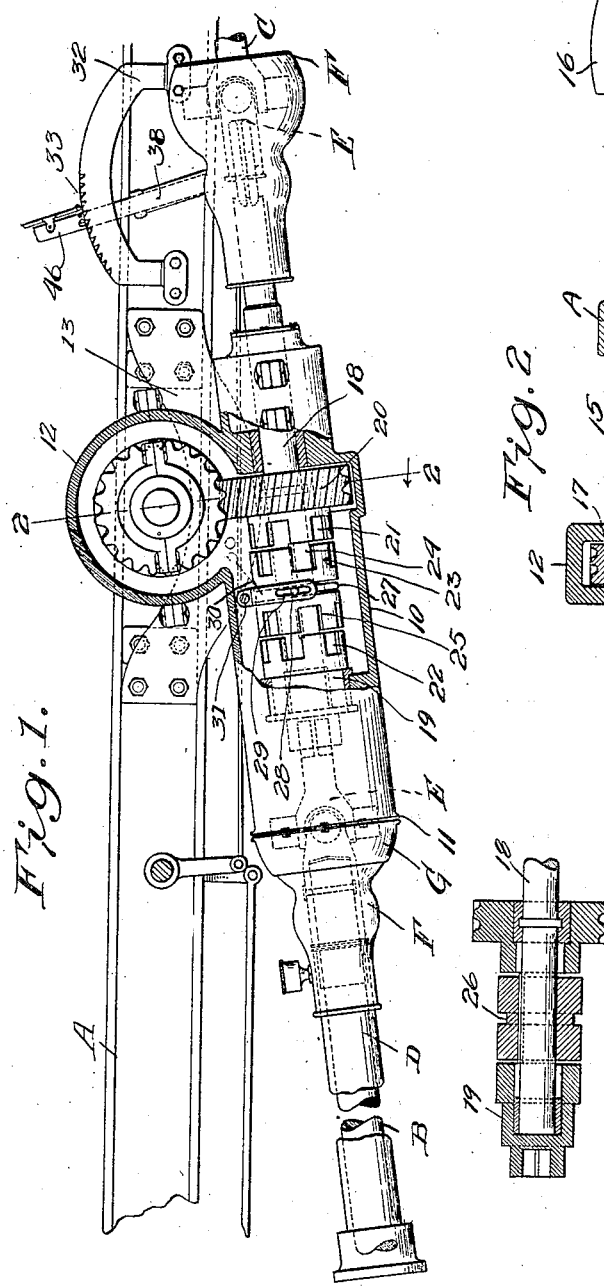
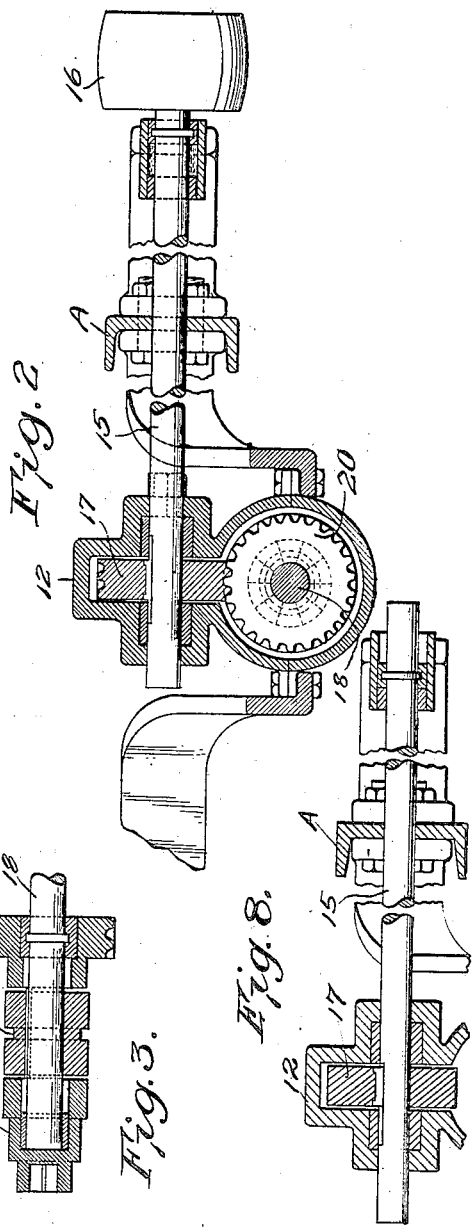
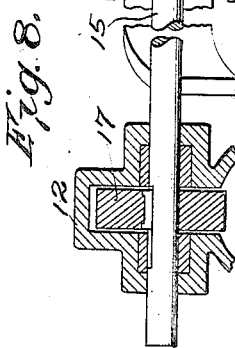
Inventor
R. F. Crawford
By E. W. Anderson Jr.
his Attorneys

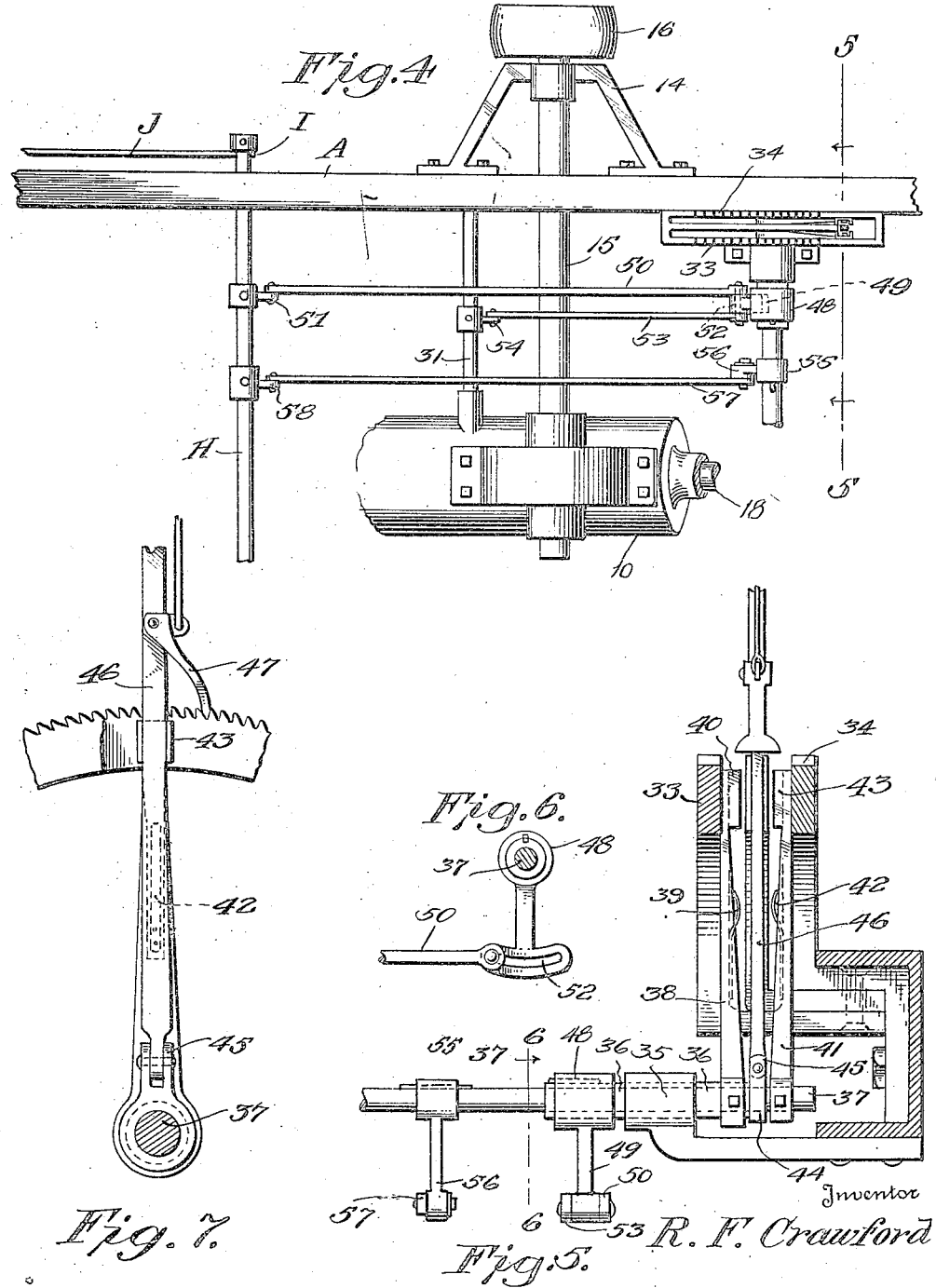

UNITED STATES PATENT OFFICE.

RALPH F. CRAWFORD, OF SALINA, KANSAS.

POWER-TRANSMISSION DEVICE.

1,379,534. Specification of Letters Patent. Patented May 24, 1921.

Application filed June 9, 1920. Serial No. 387,576.

*To all whom it may concern:*

Be it known that I, RALPH F. CRAWFORD, a citizen of the United States, resident of Salina, in the county of Saline and State of Kansas, have made a certain new and useful Invention in Power-Transmission Devices; and I declare the following to be a full, clear, and exact description of the same, such as will enable others skilled in the art to which it appertains to make and use the invention, reference being had to the accompanying drawings, and to letters or figures of reference marked thereon, which form a part of this specification.

This invention relates to attachments for motor vehicles and has for its object the provision of a power take-off device adapted to be used upon an automobile truck or pleasure car whereby the power may be transmitted to any machinery or mechanism to be driven.

An important object is the provision of a device of this character which is interposed in the drive shaft of the vehicle and which is provided with clutch means whereby power may be transmitted to the rear wheels of the vehicle to propel the same in the ordinary manner or whereby the power may be transmitted to the take-off device.

Another object is the provision of a control lever operatively connected with the clutch mechanism whereby to throw the clutch mechanism into either desired position, this lever being also operatively connected with the brake pull rods in such a way that when the clutch mechanism is in position to drive the power take-off device the brakes will be automatically applied to hold the vehicle stationary, the lever being shiftable and movable in another plane whereby to control the brakes when the clutch mechanism is in such position as to effect propulsion of the vehicle with the take-off device idle.

A further object is the provision of a device of this character which may be associated with an automobile of any type by interposing it within the drive shaft, it being of course apparent that the drive shaft itself must be in some respects altered as to length.

An additional object is the provision of a device of this character which will be comparatively simple and inexpensive in manufacture and installation, easy to operate, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of my device in position upon a portion of the frame of an automobile, part of the casing being broken away, Fig. 2 is a cross sectional view on the line 2—2 of Fig. 1, Fig. 3 is a detail sectional view through the clutch mechanism, Fig. 4 is a plan view, Fig. 5 is a cross sectional view on the line 5—5 of Fig. 4, Fig. 6 is a cross sectional view on the line 6—6 of Fig. 5, and Fig. 7 is a detail view showing a side elevation of the operating lever.

Fig. 8 is a view similar to Fig. 2, showing the pulley removed and its shaft slid inwardly.

Referring more particularly to the drawings, the letter A designates one of the frame bars of an automobile chassis, B and C designate the sections of the cut-away drive shaft, D designates the housing for the rear section of the drive shaft, E designates the universal joint provided at the forward ends of the drive shaft sections B and C, and F designates the universal joint housings. The only difference between the structure thus far described and the ordinary structure is that the drive shaft and its housing are interrupted and that the end of each section of the shaft and housing is provided with a universal joint and universal joint housing, respectively.

The numeral 10 designates a cylindrical casing provided at one end with an outturned flange 11 and having formed transversely of its upper part a gear housing 12. This casing is secured upon the frame bar A by means of bracket arms 13 secured to the casing, as clearly shown in Fig. 2, and bolted onto the frame bar.

Journaled through the gear housing 12 and through a bracket 14 secured on the outside of the frame bar A, is a shaft 15 which carries at its outer end a pulley 16 about which may be trained any suitable belt, not shown, for transmitting power to any mechanism desired to be driven. Keyed upon the shaft 15 within the housing 12 is a spiral gear 17.

The flanged end 11 of the casing 10 is secured to the usual universal joint housing retaining collar G. Journaled through the casing 10 is a shaft 18 which has its forward end connected with the forward universal joint E and which has its rear end rotatable within a sleeve 19 secured to the stem of the rear universal joint E. Relative rotation of the shaft 18 and rear section B of the drive shaft, is thus permitted. Rotatable upon the shaft 18 intermediate its ends is a spiral gear 20 which meshes with the spiral gear 17 and formed upon one face of this gear 20 is a clutch face 21. Formed upon the sleeve 19 is a clutch face 22.

In order that either the gear 20 or the sleeve 19 may be locked for rotation with the shaft 18, I provide a clutch member 23 splined upon the shaft 18 and having clutch faces 24 and 25 adapted to be engaged selectively with the clutch faces 21 or 22. This clutch member 23 is formed centrally with a circumferential groove 26 within which is engaged a collar 27 having laterally projecting pins 28 engaged within slots 29 in a shifting fork 30, pivoted upon the shaft 31 extending into the casing 10, and this clutch member 23 is shifted into any of its positions by moving the fork 30.

In order to effect proper shifting of the clutch member, I provide a bracket 32 secured upon the frame bar A and formed with spaced parallel toothed segments 33 and 34. Journaled beneath the bracket 32, as within a bearing 35, is a transverse shaft 36 which is tubular and through which is rotatable a shaft 37. Secured upon the shaft 36 is an arm 38 engaged by a spring 39 and formed at its upper end with a U-shaped portion 40 lying adjacent the segment 33. Secured upon the shaft 37 is a similar arm 41 engaged by a spring 42 and having its upper end formed with a U-shaped portion 43 lying adjacent the segment 34. Rotatably mounted upon the shaft 36 between the arms 38 and 41, is a collar 44 having ears 45 between which is pivoted a lever 46 carrying the usual type of manually releasable pawl 47 adapted to coöperate with either of the segments 33 or 34 for maintaining the lever 46 in any adjusted position.

The letter H designates the usual rock shaft which carries the rocker arms I with which are connected the pull rods J connected with the hub brakes of the automobile. Secured upon the hollow shaft 36 is a sleeve 48 carrying an arm 49 with the lower end of which is pivotally connected a link 50 which is pivotally connected with an arm 51 secured upon the rock shaft H. The end of the arm 49 is formed with a slot 52 within which the link 50 is pivoted and the purpose of this slot is to provide lost motion under some conditions, as will be hereinafter explained. Also pivotally connected, but not slidably, with the arm 49, is a link 53 which is pivotally connected with an arm 54 secured upon the clutch control shaft 31.

Secured upon the shaft 37 is a sleeve 55 having a depending arm 56 with which is pivotally connected a link 57 which is in turn pivotally connected with an arm 58 secured upon the rock shaft H.

The operation of the device is as follows:

Assuming that everything is in neutral position, when the operator desires to drive the automobile in the ordinary manner and in making use of the ordinary power take-off device, he grasps the handle, not shown, of the lever 46 and moves the lever laterally against the resistance of the spring 39 and engages the lever within the U-shaped member 40. He then pushes the lever forwardly whereupon the hollow shaft 36 will be rocked which will result in rearward swinging of the arm 49 and rearward longitudinal movement of the link 53. The link 50 will not be moved owing to the provision of the lost motion slot 52. The rearward movement of the link 53 results in swinging of the arm 54 and consequent rocking of the shaft 31 which will cause the fork 30 to slide the clutch member 23 rearwardly with the clutch face 25 engaging the clutch face 22. The entire drive shaft or all the sections thereof, will then rotate and power will be applied to the vehicle in the usual manner. When it is desired to apply the brakes, the operator grasps the lever 46 and rocks it laterally into engagement with the U-shaped member 43 and pulls backwardly upon the lever whereupon the shaft 37 will be rotated and the arm 56 swung which will result in pulling forwardly upon the link 57 and swinging the arm 58 forwardly and this will cause movement of the rock shaft H and consequent pull upon the brake pull rods J. To release the brakes it is merely necessary to move the lever forwardly while still engaged within the U-shaped member 43.

When it is desired to render the propelling mechanism idle, that is to stop the vehicle and to operate the power take-off device, it is merely necessary that the operator grasp the lever 46 and move it into engagement with the U-shaped member 40 and then pull rearwardly on the lever. This will result in rocking of the hollow shaft 36, forward swinging of the arm 48, and a forward pull on the links 50 and 53. The forward movement of the link 50 will rock the shaft H and set the brakes through the instrumentality of the pull rods J while the forward movement of the link 53 will result in rocking the shaft 31 to cause forward sliding movement of the clutch member 23 to bring the clutch face 24 thereof into engagement with the clutch face 21. The motion of the shaft 18 will then be imparted to the gear 20 and consequently to the gear 17 and power take-off pulley 16.

From the foregoing description and a study of the drawings it will be apparent that I have thus provided a simply constructed and easily controlled power take-off device formed as an attachment to any ordinary automobile, the arrangement being such that when the power take-off device is thrown into gear the brakes will be automatically set to hold the vehicle stationary and when the power take-off device is thrown out of gear and the propelling mechanism placed in gear the brakes will be automatically released, it being noticeable that the brakes may also be independently controlled entirely regardless of the automatic brake setting means.

While I have shown and described the preferred embodiment of my invention, it is of course to be understood that I reserve the right to make such changes in the form, construction, and arrangement of parts as will not depart from the spirit of the invention or the scope of the subjoined claims.

The pulley 16 is designed to overlie the running board of the car, and in order that the shaft, when the pulley is removed therefrom, shall not be in the way, I have provided for a sliding adjustment of this shaft. The bearing in the bracket 14, therefore, allows of a limited endwise movement of the shaft, and the key whereby the gear 17 is made fast is shouldered to prevent movement relative to said gear and slides in an elongated keyway of the shaft.

Having thus described my invention, I claim:

1. A power take-off attachment for motor vehicles comprising a shaft interposed in the drive shaft of the vehicle and constantly driven by the motor, a shaft journaled transversely of the vehicle frame and carrying a power transmitting device, a gear on said last named shaft, a gear rotatably mounted on said first named shaft, a clutch mechanism splined upon said first named shaft and operable whereby to lock said second named shaft for rotation with said first named shaft or to connect said first named shaft direct with the portion of the drive shaft leading to the propelling mechanism, and means for simultaneously shifting said clutch mechanism to cause rotation of said second named gear and to set the brakes of the vehicle.

2. A power take off device for motor vehicles comprising the combination with the drive shaft and the brake rods of the vehicle; of a casing secured upon the vehicle frame, a shaft within said casing and interposed within the drive shaft and constantly rotated thereby, a transverse shaft carrying a power transmitting device, a driving element on said last named shaft, a coöperating drive element rotatable upon said first named shaft and having operative engagement with said first named drive element, said second named drive element having a clutch face, a clutch face carried by the rear section of the drive shaft, a clutch member splined upon said first named shaft and movable selectively into engagement with said clutch faces, a pivoted lever connected with said clutch member whereby to move the latter, and a connection between said lever and the brake rods whereby when said clutch member is shifted to engage said second named drive element the brakes will be set.

3. A power take-off device for motor vehicles comprising the combination with the drive shaft and the brake rods of the vehicle; of a casing secured upon the vehicle frame, a shaft within said casing and interposed within the drive shaft and constantly rotated thereby, a transverse shaft carrying a power transmitting device, a driving element on said last named shaft, a coöperating drive element rotatable upon said first named shaft and having operative engagement with said first named drive element, said second named drive element having a clutch face, a clutch face carried by the rear section of the drive shaft, a clutch member splined upon said first named shaft and movable selectively into engagement with said clutch faces, a pivoted lever connected with said clutch member whereby to move the latter, and a connection between said lever and the brake rods whereby when said clutch member is shifted to engage said second named drive element the brakes will be set, and a lost motion device in the connection of the lever with the brake means whereby to permit independent operation of the brake mechanism when said lever is in position to cause engagement of said clutch member with the clutch face carried by the rear section of the drive shaft.

4. A power take-off device for motor vehicles comprising the combination with the drive shaft and the brake rods of the vehicle; of a casing secured upon the vehicle frame, a shaft within said casing and interposed within the drive shaft and constantly rotated thereby, a transverse shaft carrying a power transmitting device, a driving element on said last named shaft, a coöperating drive element rotatable upon said first named shaft and having operative engagement with said first named drive element, said second named drive element having a clutch face, a clutch face carried by the rear section of the drive shaft, a clutch member splined upon said first named shaft and movable selectively into engagement with said clutch faces, a shaft journaled transversely of the vehicle and connected with the brake pull rods, a hollow shaft journaled thereon and having an arm connected with said clutch member and the brake means, and a lever rotatable upon both of said last named shafts and adapted to rock a selected one thereof.

5. A power take-off device for motor vehicles comprising a shaft interposed in the drive shaft and selectively connected with the forward section thereof, a gear rotatable upon said shaft, a transverse shaft carrying a pulley, a gear on said transverse shaft meshing with said first named gear, a clutch member splined upon said first named shaft and movable whereby to engage a clutch face on said second named gear or a clutch face on the rear section of the drive shaft, a rock shaft having an arm, a connection between said rock shaft and said clutch member whereby to effect movement of the latter, a shaft journaled transversely of the frame and having an arm operatively connected with the brake mechanism of the vehicle, a hollow shaft rotatable on said last named shaft and connected with the brake mechanism and with the arm on the rock shaft, arms secured upon each of said last named shafts and having engaging portions, and a lever disposed between said last named arms and movable laterally whereby to engage the engaging portion of either thereof and being capable of either forward or rearward movement subsequent to such engagement whereby to rotate either of said last named shafts independently.

6. A power take-off attachment for motor vehicles, comprising a shaft interposed in the drive shaft of the vehicle and constantly driven by the motor, a shaft journaled transversely of the vehicle frame and carrying a removable power transmitting device, a gear on said last named shaft, a gear rotatably mounted on said first named shaft, and a clutch mechanism operable to lock said second named gear for rotation with said first named shaft or to connect said first named shaft direct with the portion of the drive shaft leading to the propelling mechanism, said transverse shaft being capable of a limited sliding movement in its bearings.

In testimony whereof I affix my signature, in presence of two witnesses.

RALPH F. CRAWFORD.

Witnesses:
  Geo. D. Morrow,
  L. F. Beil.